(12) United States Patent
McNab

(10) Patent No.: US 9,879,749 B2
(45) Date of Patent: Jan. 30, 2018

(54) SHOCK ABSORBER

(71) Applicant: ARB Corporation Limited, Kilsyth, Victoria (AU)

(72) Inventor: Ross McNab, Busselton (AU)

(73) Assignee: ARB CORPORATION LIMITED, Kilsyth (AU)

( * ) Notice: Subject to any disclaimer, the term of this patent is extended or adjusted under 35 U.S.C. 154(b) by 81 days.

(21) Appl. No.: 14/893,788

(22) PCT Filed: May 30, 2014

(86) PCT No.: PCT/AU2014/000568
§ 371 (c)(1),
(2) Date: Nov. 24, 2015

(87) PCT Pub. No.: WO2014/190387
PCT Pub. Date: Dec. 4, 2014

(65) Prior Publication Data
US 2016/0123425 A1    May 5, 2016

(30) Foreign Application Priority Data

May 30, 2013 (AU) ................................ 2013901930

(51) Int. Cl.
*F16F 9/48* (2006.01)
*F16F 9/19* (2006.01)
(Continued)

(52) U.S. Cl.
CPC .............. *F16F 9/48* (2013.01); *B60G 15/062* (2013.01); *F16F 9/19* (2013.01); *F16F 9/348* (2013.01);
(Continued)

(58) Field of Classification Search
CPC ...... F16F 9/48; F16F 9/19; F16F 9/348; F16F 9/3485
See application file for complete search history.

(56) References Cited

U.S. PATENT DOCUMENTS

| 1,409,849 A | 3/1922 | Haeberlein |
| 2,934,332 A * | 4/1960 | Mercier ................ F16F 9/50 |
| | | 188/281 |

(Continued)

FOREIGN PATENT DOCUMENTS

| DE | 3532292 | 3/1987 |
| EP | 1484527 | 12/2004 |

(Continued)

*Primary Examiner* — Thomas J Williams
*Assistant Examiner* — James Hsiao
(74) *Attorney, Agent, or Firm* — Davis Wright Tremaine LLP; Heather M. Colburn

(57) ABSTRACT

The present invention relates to a position sensitive shock absorber having a bypass passage adapted to communicate a working fluid between two positions in a bore, and an adjustable one-way valve arranged to direct working fluid flowing through the bypass passage, the adjustable one-way valve comprising a resiliently flexible shim having a first end fixed relative to a port, the port being in fluid communication with the bypass passage, and a free end extending from the first end and covering the port, and an adjuster having a fulcrum arranged against the shim to form a pivot, whereby when the working fluid exits the port, the free end is urged away from the port and flexes the shim about the pivot, thereby allowing the working fluid to flow through the port, and when the working fluid enters the port, the free end is urged towards the port and covers the port, thereby substantially preventing the working fluid flowing through the port, and at least one of the shim and adjuster are displaceable relative to each other, thereby moving the pivot relative to the free end.

16 Claims, 14 Drawing Sheets

(51) Int. Cl.
*F16F 9/348* (2006.01)
*F16F 9/44* (2006.01)
*B60G 15/06* (2006.01)

(52) U.S. Cl.
CPC ............ *F16F 9/3485* (2013.01); *F16F 9/446* (2013.01); *B60G 2202/312* (2013.01); *B60G 2500/11* (2013.01)

(56) References Cited

U.S. PATENT DOCUMENTS

| | | | | |
|---|---|---|---|---|
| 4,936,424 A * | 6/1990 | Costa | ................ | F16F 9/064 |
| | | | | 188/314 |
| 5,146,948 A | 9/1992 | Runkel | | |
| 5,178,239 A | 1/1993 | Homme | | |
| 5,332,068 A * | 7/1994 | Richardson | ............ | F16F 9/504 |
| | | | | 137/38 |
| 5,431,259 A * | 7/1995 | Mizutani | ................ | B60G 17/08 |
| | | | | 188/266.4 |
| 5,503,258 A | 4/1996 | Clarke et al. | | |
| 5,586,627 A | 12/1996 | Nezu et al. | | |
| 5,788,030 A | 8/1998 | Rottenberger | | |
| 5,833,036 A | 11/1998 | Gillespie | | |
| 6,244,398 B1 | 6/2001 | Girvin et al. | | |
| 6,415,895 B2 | 7/2002 | Marking et al. | | |
| 6,615,960 B1 | 9/2003 | Turner | | |
| 7,128,192 B2 * | 10/2006 | Fox | ................ | B62K 25/04 |
| | | | | 188/266.2 |
| 7,191,877 B2 * | 3/2007 | Norgaard | ............ | F16F 9/3235 |
| | | | | 188/274 |
| 7,261,194 B2 * | 8/2007 | Fox | ................ | B62K 25/04 |
| | | | | 188/275 |
| 7,270,222 B1 | 9/2007 | Aymar | | |
| 7,562,750 B2 * | 7/2009 | Lemmens | ............ | B60G 17/08 |
| | | | | 188/266.1 |
| 7,753,179 B2 | 7/2010 | Robertson | | |
| 8,430,217 B2 * | 4/2013 | Hennecke | ............ | F16F 9/3485 |
| | | | | 188/266.2 |
| 8,517,153 B2 * | 8/2013 | Baltes | ............ | F16F 9/3485 |
| | | | | 188/282.6 |
| 8,607,942 B2 * | 12/2013 | Becker | ................ | F16F 9/446 |
| | | | | 188/275 |
| 2003/0094341 A1 | 5/2003 | Lemieux | | |
| 2005/0104320 A1 * | 5/2005 | Wesling | ............ | B62K 25/08 |
| | | | | 280/276 |
| 2009/0020382 A1 | 1/2009 | Van Weelden et al. | | |
| 2009/0223763 A1 | 9/2009 | Lude | | |
| 2010/0109277 A1 | 5/2010 | Furrer | | |
| 2012/0018263 A1 | 1/2012 | Marking | | |
| 2012/0018264 A1 | 1/2012 | King | | |

FOREIGN PATENT DOCUMENTS

| | | |
|---|---|---|
| EP | 2192323 | 6/2010 |
| EP | 2402626 | 1/2012 |
| GB | 2111168 | 6/1983 |
| WO | 2008036027 | 3/2008 |
| WO | 2012177849 | 12/2012 |

* cited by examiner

SHOCK ABSORBER

TECHNICAL FIELD

The present invention relates to a shock absorber for a vehicle and in particular, relates to a shock absorber having at least one bypass passage in fluid communication with two locations in the shock absorber.

BACKGROUND TO THE INVENTION

Shock absorbers are used to reduce force transmitted to a structure such as a vehicle chassis, known as a 'sprung part', from a moving part such as a wheel, known as an 'unsprung part'.

A conventional vehicle shock absorber comprises a body connected to the chassis of the vehicle, the body having a bore which contains a volume of working fluid. A piston is connected to the wheel and arranged within and axially displaceable along the bore, dividing the bore into a 'compression chamber' and a 'rebound chamber'. When the wheel comes into contact with irregular portions of road or obstacles it is displaced, forcing the piston through the bore. Due to the working fluid within the bore, the movement of the piston is obstructed and the rate of displacement is dependent on vents through the piston allowing the working fluid to pass through. This action reduces the velocity of the piston and dissipates kinetic energy, known as providing a 'damping force'.

Shock absorbers are typically 'velocity sensitive' and generate damping force as a function of shaft velocity. Some shock absorbers are also 'position sensitive' and generate damping force as a function of shaft velocity and piston location (position) within the bore. This provides an additional benefit that damping force may be varied according to amplitude of piston displacement. This typically involves providing a low damping force for small amplitude inputs and a larger damping force for large amplitude inputs.

One type of position sensitive shock absorber is known as a 'bypass shock absorber' which has an auxiliary conduit, known as a 'bypass passage', that communicates the working fluid between two locations in the bore during a defined portion of the stroke of the piston, known as a 'bypass zone'. When the piston is displaced in this portion, the bypass passage allows additional working fluid to be displaced between the two locations and increases the rate of fluid flowing past the piston, which decreases the damping force. This is useful where, for example, during general use (such as on-road use) the piston is typically displaced in a mid-portion of the bore in a bypass zone, and a low damping force is required. However, when the vehicle is used off-road and typically encounters larger obstacles and impact forces, this displaces the piston out of the bypass zone, substantially increasing the damping force and absorbing the impact force.

One example of a bypass shock absorber is disclosed in U.S. Pat. No. 7,191,877 in the name of Thyssenkrupp Bilstein of America, Inc. in which a body houses a bore and four bypass passages, the bypass passages having different effective lengths and being operable over a different section of the bore. During part of either a compression or rebound stroke of a piston within the bore, there are either two, one or no bypass passages communicating fluid from one side of a piston to the other, progressively increasing the damping force as less bypass passages communicate fluid. Each bypass passage has an adjustable one-way 'check valve' located at one end of the passage to prevent fluid from flowing through the passage during a defined stroke direction. This has the effect that two of the bypass passages communicate fluid around the piston in a compression stroke only and two allow fluid to pass in a rebound stroke only. Each of the adjustable valves are adjustable to control the rate of fluid flowing through each valve. The valve is adjusted by rotating a dial which changes the size of an aperture (orifice) fluid can flow through, thereby restricting the flow of fluid through each bypass passage and increasing the damping force provided.

Whilst this would provide an adequate position sensitive shock absorber, the disclosed shock absorber also has a number of disadvantages. For example, if a user wishes to tune the damping characteristics of the shock absorber, each adjustable valve must be individually adjusted. If the user wishes for the tuning of the bypass passages to be consistent, each valve must be individually adjusted to provide a consistent damping characteristic. This is not only time consuming but also complex for the user to perform accurately, as each valve of this type has a non-linear flow characteristic. The non-linear flow characteristic means that the valve offers little resistance to flow at low fluid flow rates but substantial resistance at higher fluid flow rates. This results in little damping force being provided for low velocity impacts, which is typical during on-road use, and significantly more for high velocity impacts, resulting in an unnecessarily soft ride and poor chassis control when used on-road.

To counteract the poor on-road handling provided by this style of shock absorber, the shock absorber is commonly used in conjunction with a secondary, coil-carrying shock absorber to provide additional, low-velocity damping. However this further increases the inconvenience and complexity of this style of shock absorber, requiring more space in the vehicle and increasing the likelihood of maintenance issues.

Accordingly, it would be useful to provide a bypass shock absorber which provides adequate low-velocity and high-velocity damping, without requiring a secondary shock absorber. This is of particular importance in relation to retro-fitting such a shock absorber, as many vehicle typically provide space for a single shock absorber to be fitted to each wheel. Furthermore, it would be advantageous to provide such a shock absorber which can be conveniently and accurately adjusted to provide a range of damping force.

SUMMARY OF THE INVENTION

According to one aspect of the invention there is provided an adjustable one-way valve comprising a shim having a fixed end fixed relative to a port and a free end extending from the fixed end and covering the port, the shim being resiliently flexible, and an adjuster having a fulcrum arranged against the shim to form a pivot, whereby when a working fluid exits the port, the free end is urged away from the port and flexes the shim about the pivot, thereby allowing the working fluid to flow through the port, and when the working fluid enters the port, the free end is urged towards the port and covers the port, thereby substantially preventing the working fluid flowing through the port, and at least one of the shim and adjuster are displaceable relative to each other, thereby moving the pivot relative to the free end.

According to another aspect of the invention, there is provided a shock absorber comprising a body defining a bore containing a working fluid, a piston slidable within the bore, two apertures arranged at respective spaced apart positions axially along the bore and extending through a side-wall of the bore, a bypass passage in fluid communication with the two apertures, the bypass passage defining a conduit therebetween, and an adjustable one-way valve comprising a shim having a first end fixed relative to a port and a free end extending from the first end and covering the port, the shim being resiliently flexible, and an adjuster having a fulcrum arranged against the shim to form a pivot, whereby when the working fluid exits the port, the free end is urged away from the port and flexes the shim about the pivot, thereby allowing the working fluid to flow through the port, and when the working fluid enters the port, the free end is urged towards the port and covers the port, thereby substantially preventing the working fluid flowing through the port, at least one of the shim and adjuster being displaceable relative to each other, thereby moving the pivot relative to the free end, and the port is in fluid communication with the bypass passage, thereby allowing the working fluid to flow through the bypass passage when the working fluid exits the port.

According to a further aspect of the invention, there is provided a shock absorber comprising a body defining a bore containing a working fluid, a piston slidable within the bore, the piston having a vent therethrough, and an adjustable one-way valve comprising a shim having a first end fixed relative to a port and a free end extending from the first end and covering the port, the shim being resiliently flexible, and an adjuster having a fulcrum arranged against the shim to form a pivot, whereby when the working fluid exits the port, the free end is urged away from the port and flexes the shim about the pivot, thereby allowing the working fluid to flow through the port, and when the working fluid enters the port, the free end is urged towards the port and covers the port, thereby substantially preventing the working fluid flowing through the port, at least one of the shim and adjuster being displaceable relative to each other, thereby moving the pivot relative to the free end, and the port is in fluid communication with the vent, thereby allowing the working fluid to flow through the vent when the working fluid exits the port.

Referring to an alternative aspect of the invention, there is provided a shock absorber comprising a body defining a bore having a first end and a second end, and containing a working fluid, a piston slidable within the bore and dividing the bore into a compression chamber and a rebound chamber, the piston having a vent therethrough, an aperture extending through a side-wall of the bore, a reservoir connected to the body, the reservoir adapted to receive the working fluid, and a bypass passage in fluid communication with the aperture and the reservoir, the bypass passage defining a conduit therebetween.

According to a further alternative aspect of the invention, there is provided a shock absorber comprising a body defining a bore containing a working fluid, and having a first bypass passage arranged concentric and adjacent to the bore, a piston slidable within the bore, the piston dividing the bore into a compression chamber and a rebound chamber, a first aperture and a second aperture arranged at respective spaced apart positions axially along the bore and extending through a side-wall of the bore, the first aperture in fluid communication with the first bypass passage, and a fluid distributor connected to the body and adapted to receive a portion of the bore, the fluid distributor defining a first conduit between the second aperture and the first bypass passage, thereby communicating the working fluid from the bore to the first bypass passage.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

The present disclosure generally relates to a shock absorber for a vehicle having one or more bypass passages adapted to communicate a working fluid between different locations in a bore whilst a piston is displaced in a defined portion of the bore, or between a location in a bore and a reservoir of working fluid. In particular, the present invention relates to a position sensitive shock absorber having an adjustable one-way valve arranged in each bypass passage, the one-way valve having a shim which flexes about a pivot to allow the working fluid to flow through the bypass passage in a single direction only, and whereby the position of the pivot can be adjusted to adjust the spring rate of the shim, which adjusts the damping force provided by the bypass passage. The disclosure also relates to the adjustable one-way valve itself, and to an alternative shock absorber having a body that defines a bore and one or more bypass passages, and a fluid distributor component which provides one or more respective conduits between the bore and the bypass passages, and also may house one or more respective one-way valves.

Figure 1:
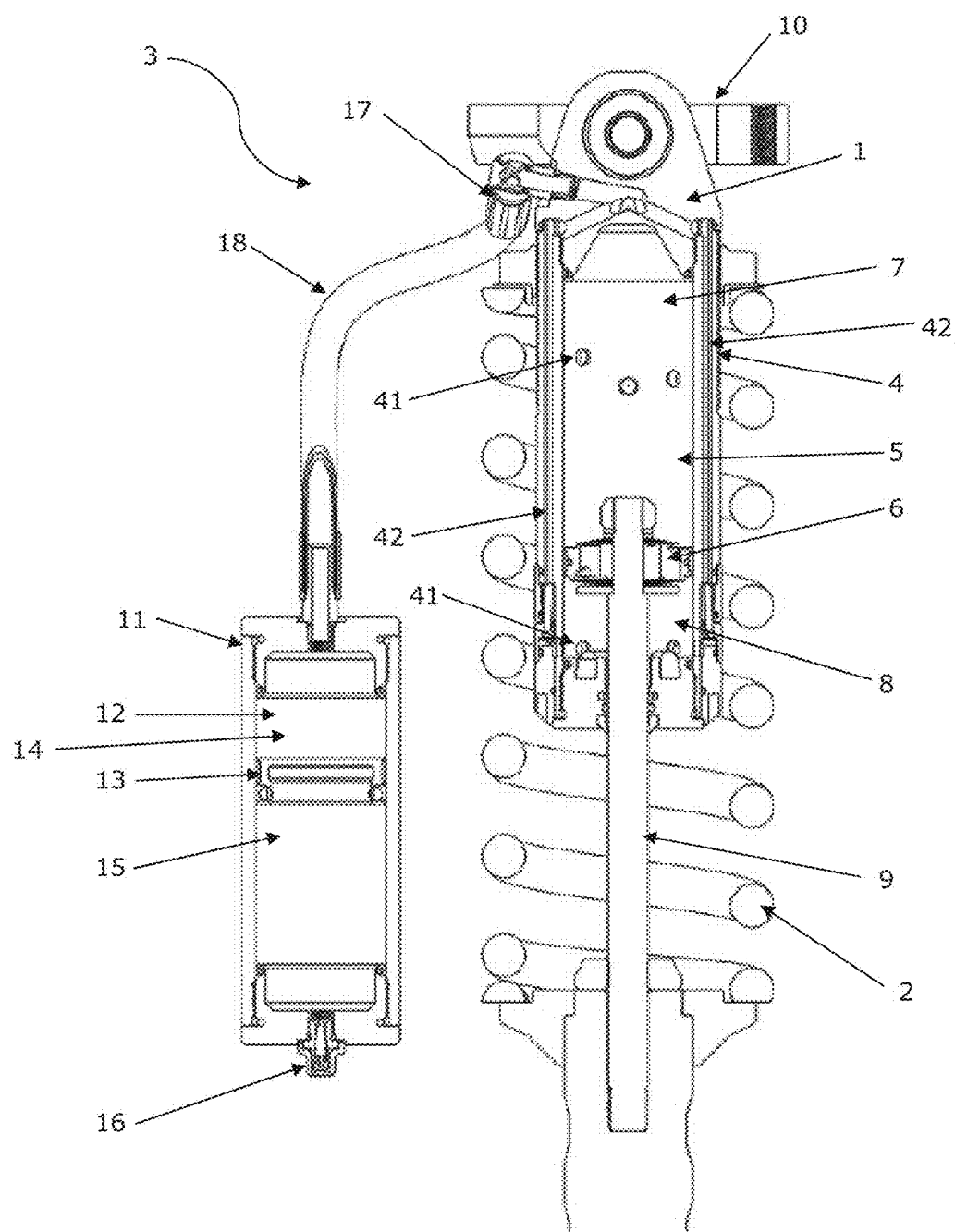
FIG. 1 is a cross-section view of a shock absorber.

In FIG. 1, a suspension strut 3 is shown in cross-section, the suspension strut 3 comprising a shock absorber 1 housing a coil spring 2. The shock absorber 1 comprises a body 4 having a cylindrical bore 5 containing a working fluid, the body being connected to a vehicle chassis 10. A piston 6 is disposed within the bore 5 having a seal around a peripheral region which seals the piston against side-walls of the bore 5, thereby dividing the bore 5 into two portions; a compression chamber 7, being the portion of bore the piston 6 moves towards during a compression stroke, and a rebound chamber 8, being the portion of the bore 5 the piston 6 moves towards during a rebound stroke. The piston 6 is a conventional vented piston, having one or more valves to control the flow of the working fluid through vents as the piston 6 travels through the bore 5. A rod 9 is connected between the piston 6 and a wheel (not shown).

The bore 5 is in fluid communication with a reservoir 11 via a union 17 and hose 18, in this case being a piston type pressure accumulator. The reservoir 11 comprises a reservoir bore 12 and a floating piston 13, dividing the reservoir bore 12 into a fluid chamber 14, filled with the working fluid, and a gas chamber 15, filled with a gas. The floating piston 13 is displaceable within the reservoir bore 12 dependent on working fluid displaced by the piston 6 from the bore 5. The pressure of the gas in the gas chamber 15 is adjustable using the gas valve 16. Whilst it is preferable that the reservoir is a piston type pressure accumulator, the reservoir could also be a flexible diaphragm type (not shown) or a resilient closed cell foam type (not shown).

A plurality of apertures 41 are arranged through a side-wall of the bore 5, providing a fluid port between the bore 5 and one of a plurality of bypass passages 42 formed in an annular region concentric to the bore 5 in the body 4. Each bypass passage 42 provides a conduit for communicating the working fluid between a pair of apertures 41 arranged in a spaced apart position axially along the bore 5 when the piston 6 moves along the bore 5 between the pair of apertures 41, thereby forcing the working fluid to enter one of the pair of apertures 41 and exit the other. Each pair of apertures 41 and an associated bypass passage 42 defines a 'bypass zone' in which the working fluid flow rate is increased and damping force is reduced accordingly.

Figure 2:
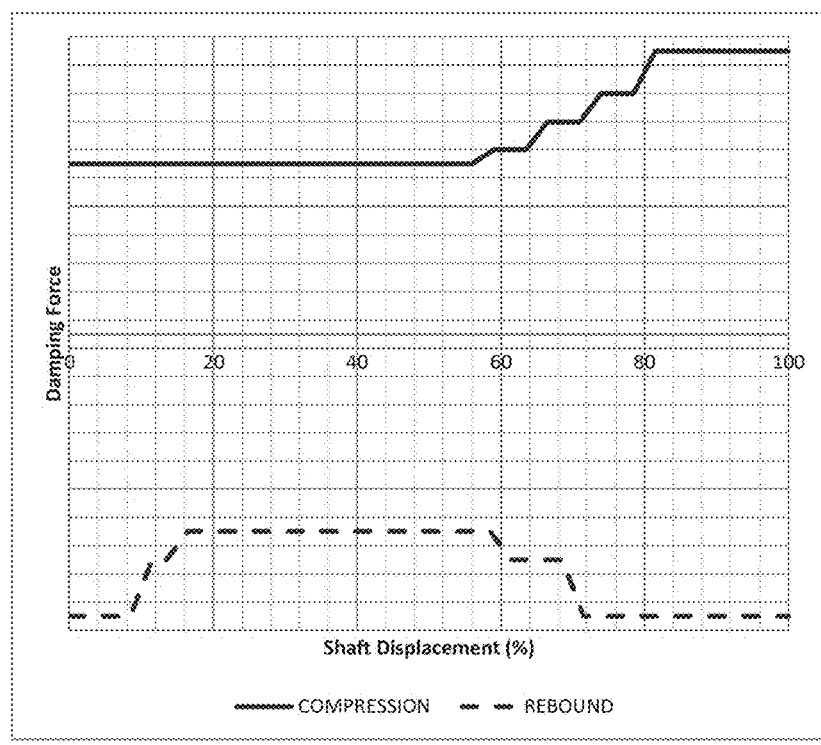
FIG. 2 is a graph of damping force vs. piston displacement provided by the shock absorber.

FIG. 2 is a graph of damping force vs. piston displacement, illustrating the range of damping force provided by the shock absorber 1 during a compression and rebound stroke. In a compression stroke, the damping force increases in four defined increments, corresponding with four pairs of apertures 41 and four bypass passages 42, towards the maximum displacement of the piston 6. The increase in damping force is due to four bypass passages 42 being operational during the majority of a compression stroke (0-60% displacement of piston) and progressively less bypass passages 42 being operational during the top portion of stroke (60-80% of piston displacement), until no bypass passages function in the end portion of the stroke (80-100% of piston displacement). A similar damping force relationship is provided during a rebound stroke.

The damping force curves shown in FIG. 2 show that the shock absorber 1 is optimised for a vehicle where during 'on-road' use the piston 6 is displaced between 30-60% of the stroke and the damping force is relatively low, providing a comfortable ride. When the vehicle is driven off-road and subjected to much higher impact forces, causing larger amplitude displacement of the piston 6 of higher than 60%, the damping force significantly increases. It will be appreciated that the position of apertures 41 and number of bypass passages 42 may be varied in order to affect the damping force provided as the piston 6 is displaced through the bore 5.

Figure 3:
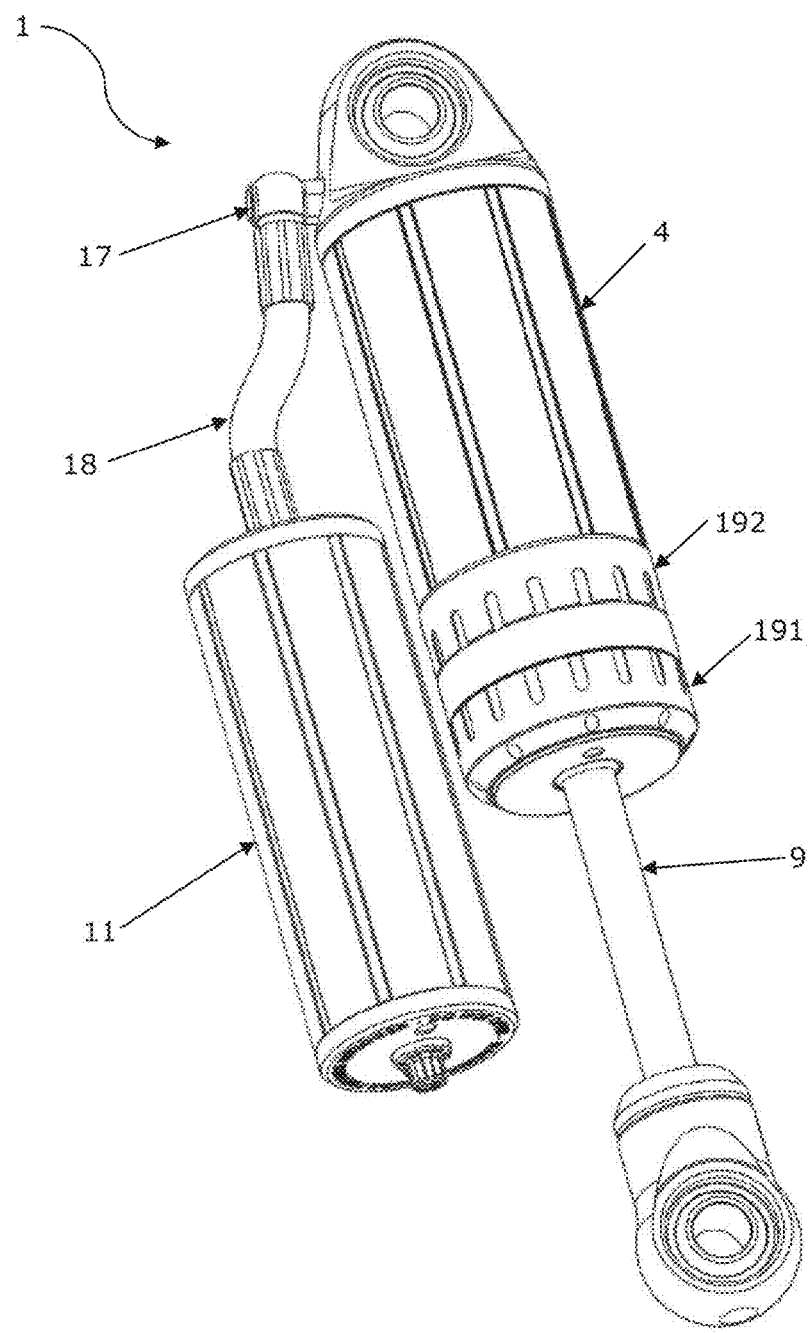
FIG. 3 is a perspective view of the shock absorber.

In FIG. 3, a perspective view of the shock absorber 1 is shown, where the shock absorber 1 is disconnected from the spring 2 and vehicle. Two valve adjuster rings 191, 192 are connected to the body 4, each connected to one or more adjustable one-way valves (not shown) in fluid communication with one or more respective bypass passages 42. The upper adjuster ring 192 is connected to each adjustable one-way valve arranged to allow working fluid to flow through a respective bypass passage 42 during a rebound stroke. The lower adjuster ring 191 is connected to each adjustable one-way valve arranged to allow working fluid to flow through a respective bypass passage 42 during a compression stroke. By rotating either ring 191, 192, all of the associated adjustable one-way valves are adjusted simultaneously.

Figure 4:
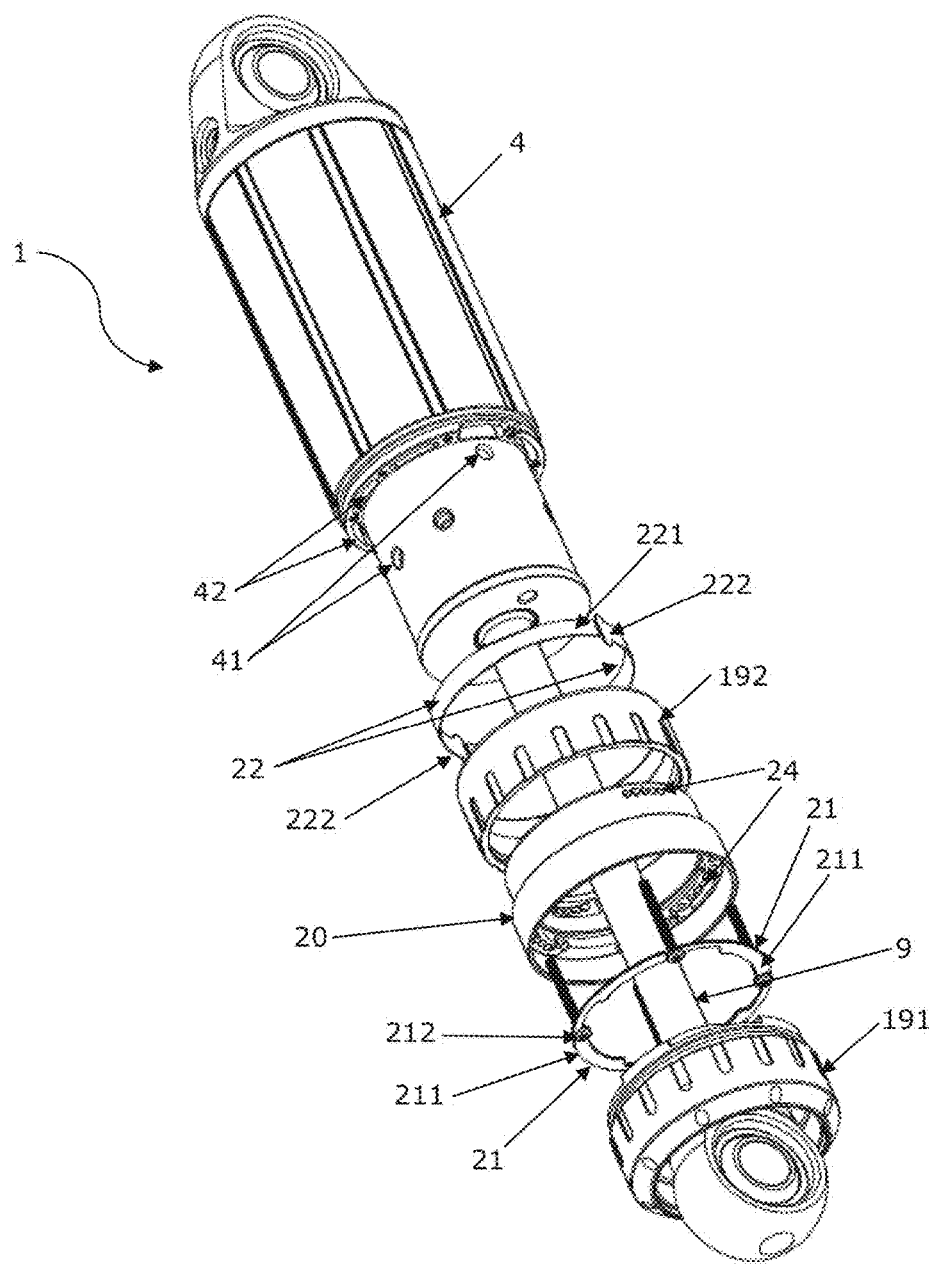
FIG. 4 is an exploded perspective view of the shock absorber.

FIG. 4 shows an exploded perspective view of the shock absorber 1 with the reservoir 11, hose 18 and union 17 removed. A fluid distributor 20 is spaced apart from the body 4, having an aperture therethrough adapted to receive a portion of the body 4 housing the bore 5. The fluid distributor 20 defines a plurality of conduits, each conduit adapted to communicate working fluid from one of the apertures 41 to one of the bypass passages 42 (or vice versa). The fluid distributor 20 also engages with each adjuster ring 191, 192, thereby providing a track for each adjuster ring 191, 192 to slide on when rotated.

A plurality of shims 21, 22 are arranged concentric to the bore 5 and connected to the fluid distributor 20, each shim 21, 22 having a planar body having a fixed end 212, 222 fixed to the fluid distributor 20 and a free end 211, 221 arranged over a port 24 formed at an end of one of the conduits. Each shim 21, 22 has at least a portion formed from a resiliently flexible material, such as high strength, high fatigue life steel or stainless steel, thereby when the working fluid is forced through an associated conduit and exits the port 24, the free end 211, 221 flexes away from the port 24, allowing the working fluid to flow through the port 24. Alternatively, when the working fluid is forced in an opposite direction and attempts to enter the port 24, the free end 211, 221 is urged against the fluid distributor ring 20 and covers the port 24, substantially sealing the port 24.

This functionality allows the shims 21, 22 to be used as one-way valves, known as 'check valves', to control the flow of working fluid through an associated bypass passage 42 in either a compression or rebound stroke of the piston 6. For example, four like shims 21 (compression shims 21) selectively cover the ports 24 of respective conduits in fluid communication with four respective bypass passages 42, thereby allowing the working fluid to flow when the piston 6 is displaced towards the compression chamber only. Similarly, two like shims 22 (rebound shims 22) selectively cover the ports 24 of respective conduits in fluid communication with two further respective bypass passages 42, thereby allowing the working fluid to flow when the piston 6 is displaced towards the rebound chamber only.

Each rebound shim 22 has a free end 221 covering one or more ports 24 in communication with one or more apertures 41 extending through the side-wall of the bore 5. In order to allow the free end 221 to flex away from the one or more ports 24 and allow the working fluid to flow, the planar body of each shim 21 is arranged parallel to the bore 5. Each compression shim 21 has a free end 211 covering one or more ports 42 in the fluid distributor 20 in communication with an end of respective bypass passages 42. In order to allow the free end 211 to flex away from the one or more ports 24 and allow the working fluid to flow, the shims 22 are arranged perpendicular to the bore 5.

It will be appreciated that similar arrangements of the shims 21, 22 in relation to the body 4 and bypass passages 42, such as where the fluid distributor 20 is not present and each shim 21, 22 is fixed directly to the body 4, are within the scope of this disclosure. Similarly, the groups of shims 21, 22 may be spaced apart from each other, for example, the body 4 may include a first group of shims arranged at one end of the bore 5 to control fluid flow during a compression stroke, and a second group of shims arranged at an opposite end of the bore 5 to control fluid flow during a rebound stroke. Furthermore, the fluid distributor 20 may house or be connected to one or more alternative one-way valves to the shim 21, 22 arrangement discussed above, such as a poppet valve, plunger valve or solenoid valve.

Figure 5A:
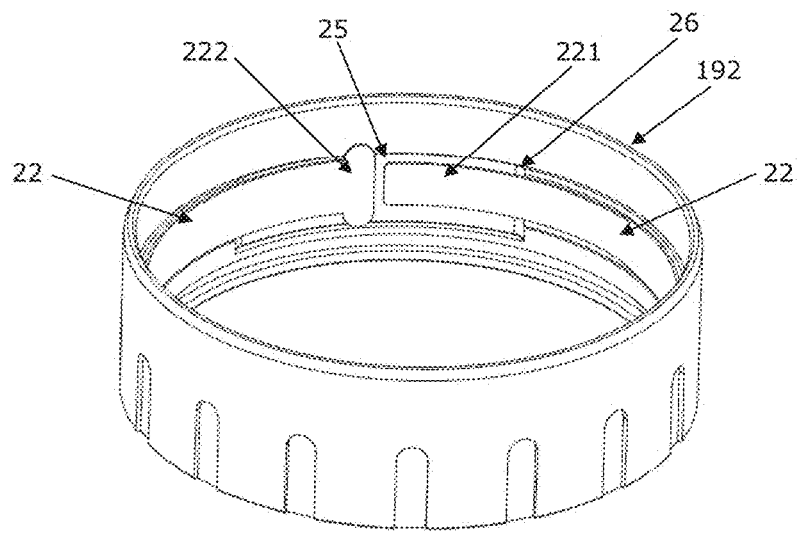
FIG. 5A is a perspective view of an adjuster ring and a plurality of shims.

In FIG. 5A, the rebound adjuster ring 192 and the two rebound shims 22 are shown. The adjuster ring 192 defines a cavity 25 adapted to receive the free end 221 thereby allowing the free end 221 to flex away from an associated port 24 when the working fluid is force through and exits the port 24. At one side of the cavity is a fulcrum 26, being an edge of the cavity 25. The fulcrum 26 abuts the free end 221 providing a pivot around which the shim 21 flexes when the working fluid exits the port 24. When the adjuster ring 192 is rotated around the bore 5, the fulcrum is moved relative to the free end 221, thereby adjusting the length of the free end 221 able to pivot, consequently adjusting the effective stiffness of the shim 22. Rotation of the adjuster ring 192 therefore adjusts the damping force provided by an associated bypass passage 42. As the fulcrum 26 is moved towards the free end 221, the active length of the shim 22 decreases and the effective stiffness of the shim 22 increases, requiring more force to be exerted by the working fluid to bend the shim 22 away from the port and allow the fluid to flow, consequently increasing the damping force of the associated bypass passage 42. Alternatively, the fulcrum 26 may be fixed relative to the bore 5, for example, formed on the fluid distributor 20, and the adjuster ring 192 is connected to the rebound shims 22. In this arrangement, when the adjuster ring 192 is rotated, the free end 221 of each shim 22 is moved relative to the fulcrum 26, thereby adjusting the active length and effective stiffness of the shim 22.

FIG. 5A shows two rebound shims 22 connected to a common adjuster ring 192, the adjuster ring having two respective cavities 25, providing two respective fulcrums 26. Rotation of the adjuster ring 192 moves each fulcrum 26 simultaneously, thereby adjusting the active length of each shim 22 to simultaneously. It will be appreciated that the range of fulcrum 26 movement affects the range of adjustment of the shim 22. Where the range of fulcrum 26 movement for each shim 22 is identical, the adjustment of each shim 22 will be consistent. However, in some applications, it may be desirable to adjust each shim 22 at a different rate, requiring the range of respective fulcrums 26 to be different, for example, one having a larger range and the other having a smaller range, which may be provided by varying the cavity 25 dimensions.

Figure 5B:
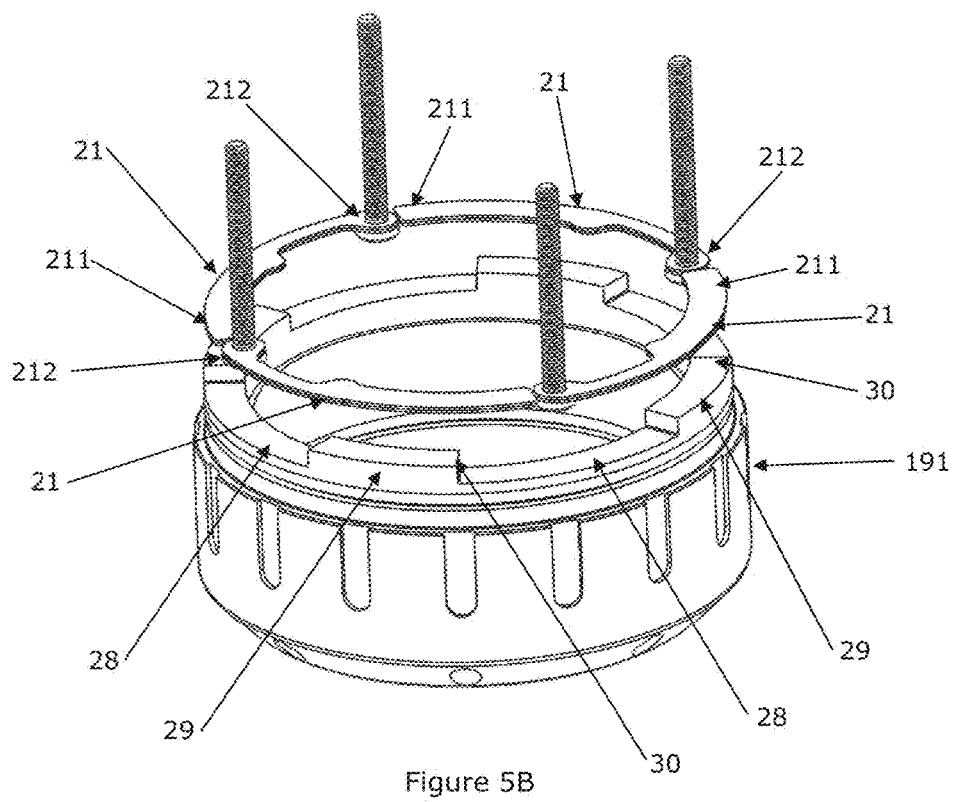
FIG. 5B is a perspective view of an alternative adjuster ring and alternative plurality of shims.

In FIG. 5B, the compression adjuster ring 191 and a plurality of compression shims 21 are shown. The compression adjuster ring 191 also has a plurality of cavities 28 formed between castellated portions 29, each castellated portion 29 forming a fulcrum 30 at one side thereof. Each compression shim 21 is fixed relative to the adjuster ring 191 having a free end 211 covering one or more ports 24. When the working fluid exits the one or more ports 24 the compression shim flexes about the fulcrum 30 allowing the working fluid to flow. The fulcrum 30 is movable relative to the free end 211, thereby adjusting the active length and effective stiffness of the shim 21, consequently adjusting the damping force provided by an associated bypass passage 42, as described above.

Figure 6:
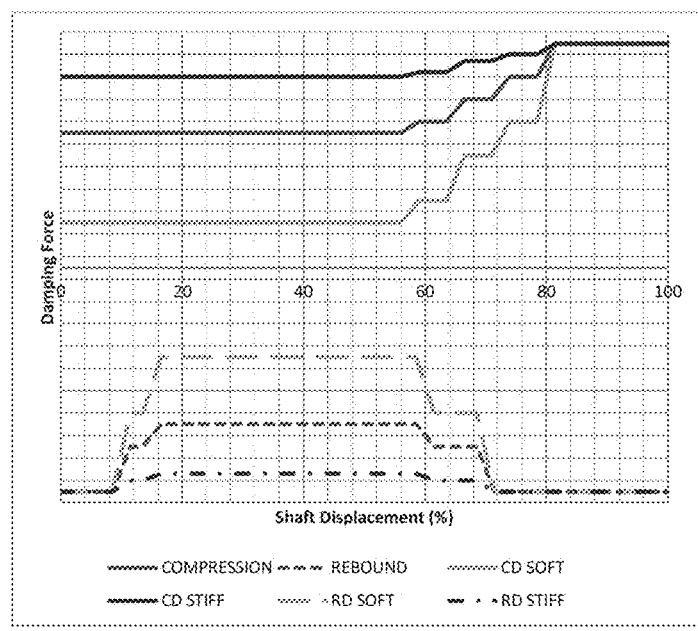
FIG. 6 is a graph of a range of damping force vs. piston displacement provided the shock absorber.

FIG. 6 is an alternative version of the graph shown in FIG. 2, illustrating variations of damping force vs. piston displacement dependent on each adjuster ring 191, 192 being rotated to a first extreme to provide a 'soft' ride, i.e. maximum active length of each shim 21, 22, and a second extreme to provide a 'stiff' ride, i.e. minimum active length of each shim 21, 22.

Figure 7:
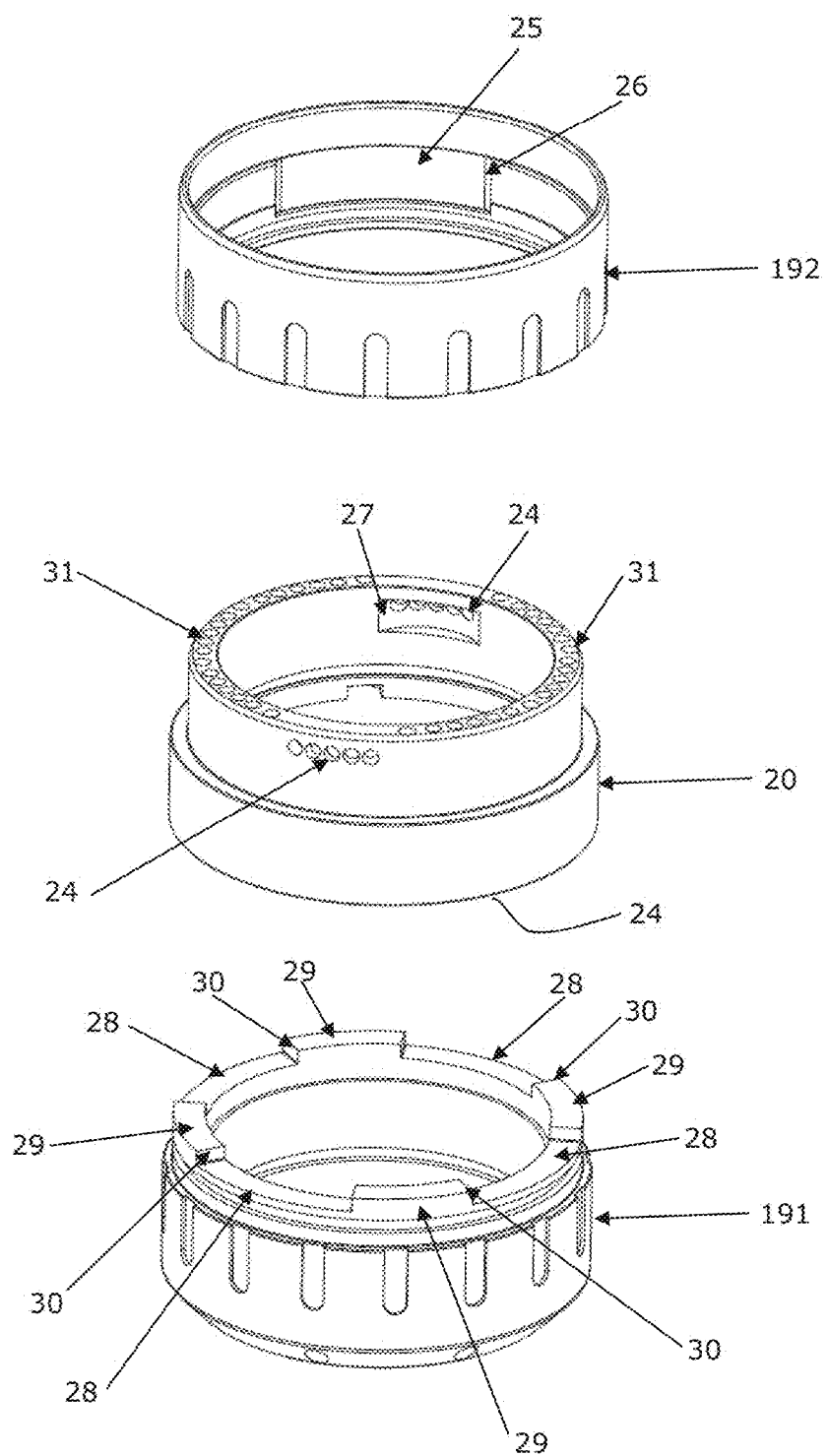
FIG. 7 is an exploded view of the adjuster rings shown in FIGS. 5A and 5B and a fluid distributor.

FIG. 7 is an exploded view of the valve adjuster rings 191, 192 spaced apart from the fluid distributor 20. A plurality of the ports 24 are arranged through a side wall of the fluid distributor 20 and in communication with a fluid inlet 27 on an opposing side wall, the fluid inlet 27 adapted to be fluidly coupled over a bypass aperture 41 and funnel the working fluid to the ports 24. Similarly, a plurality of alternative fluid inlets 31 are arranged on a top surface of the fluid distributor 21, the alternative fluid inlets 31 adapted to direct the working fluid from a bypass passage 42 to further ports 24 arranged on a bottom surface of the fluid distributor 20.

Figure 8A:
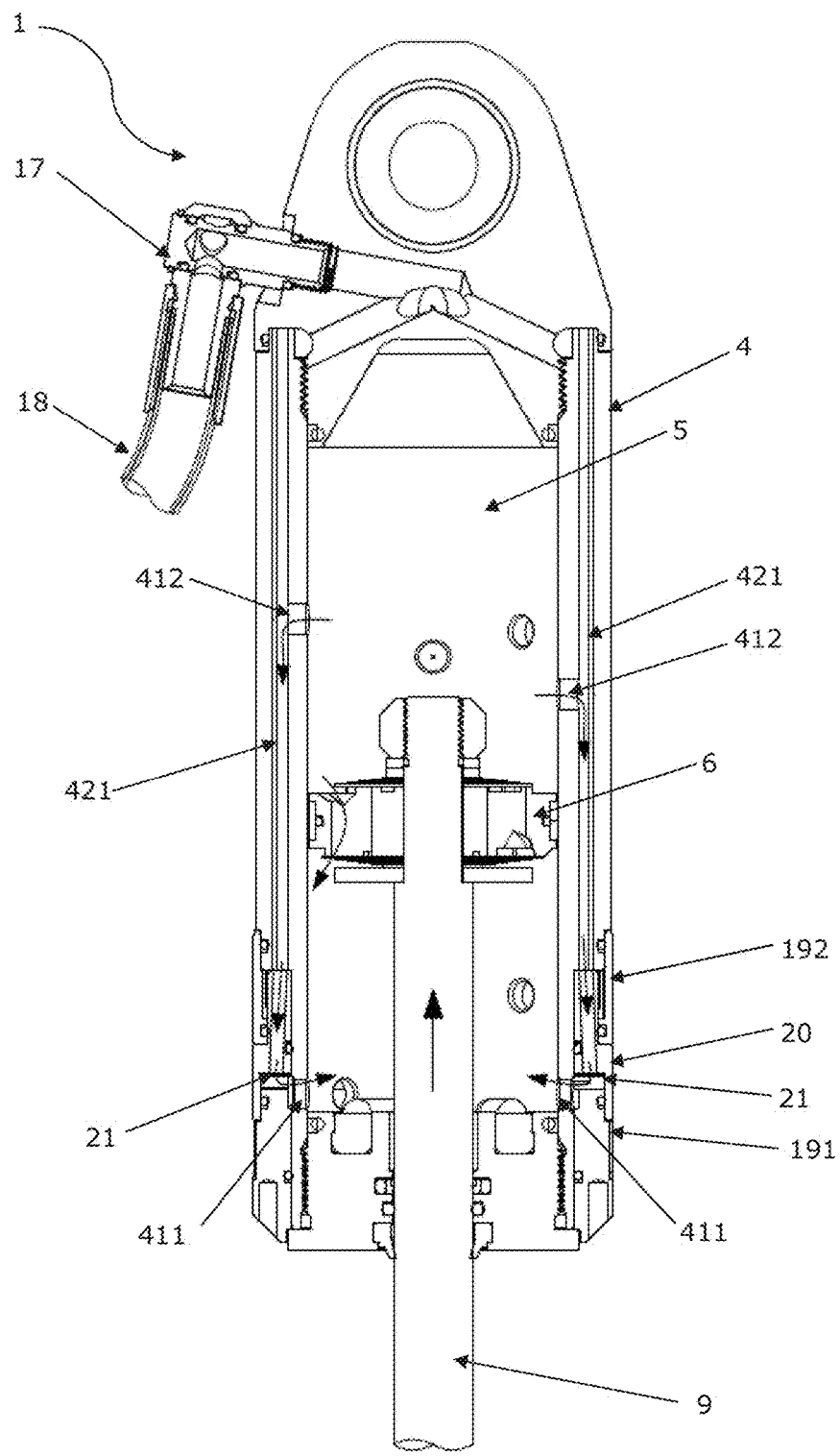
FIG. 8A is a cross-section view of the shock absorber, illustrating fluid flow paths during a compression stroke.
Figure 8B:
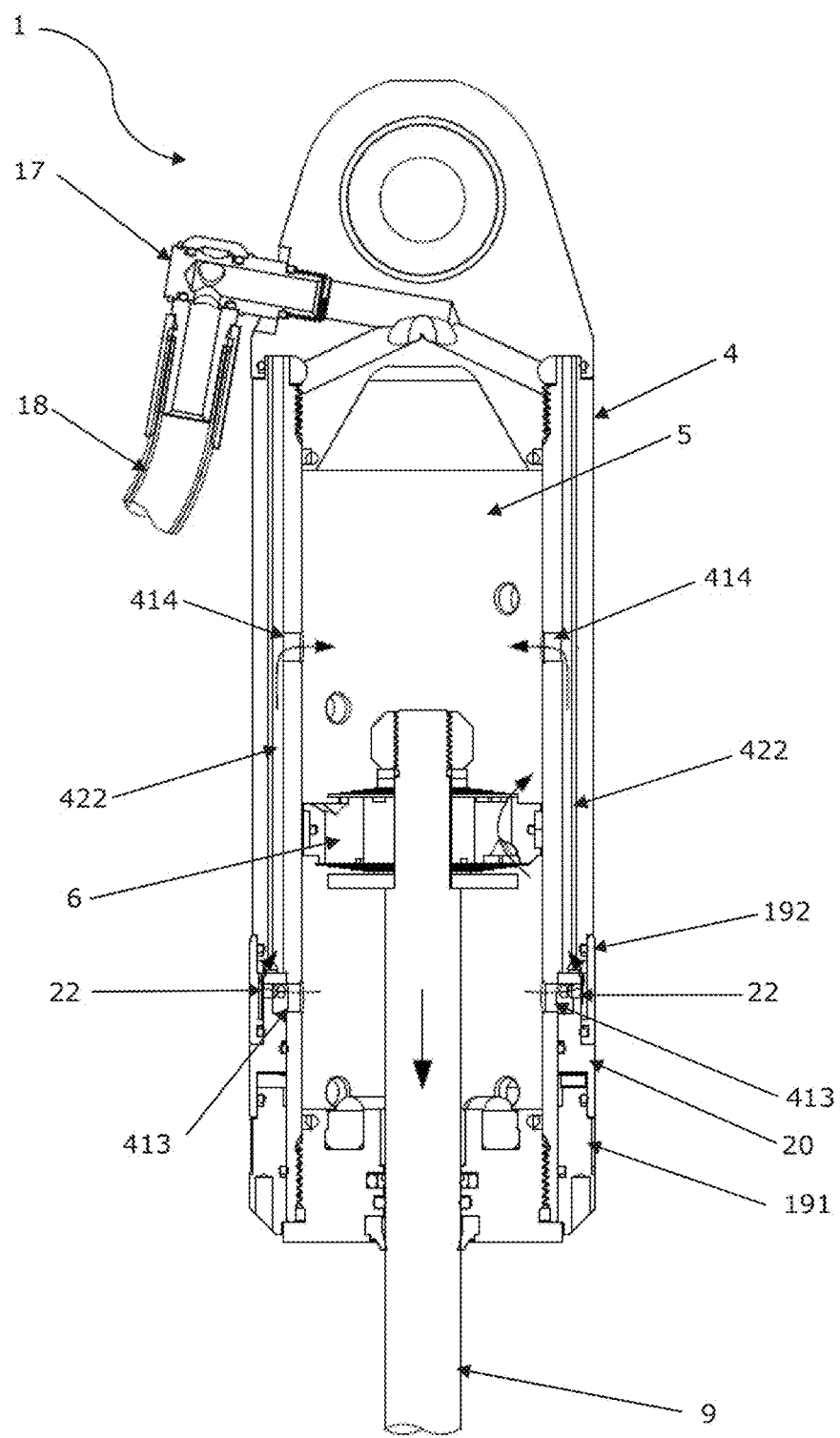
FIG. 8B is a cross-section view of the shock absorber, illustrating fluid flow paths during a rebound stroke.

FIGS. 8A and 8B are cross-sections of the shock absorber 1, illustrating the working fluid flow paths during a compression stroke and a rebound stroke.

In FIG. 8A, the piston 6 is shown moving vertically upwards, in a compression stroke, between two bypass apertures 411, 412, thereby displacing working fluid through an upper aperture 412, through a bypass passage 421 and returning to the bore 5 through a lower aperture 411. Fluid also passes through the piston 6 through a main valve or vent. Adjacent to each lower bypass aperture 411 a compression shim 21 flexes away from the one or more associated fluid ports 24, allowing the working fluid to flow into the bore 5.

In FIG. 8B, the piston 6 is shown moving vertically downwards, in a rebound stroke, between two further bypass apertures 413, 414, thereby displacing working fluid through a lower aperture 413, through a further bypass passage 422 and returning to the bore 5 through an upper aperture 414. Adjacent to each lower bypass aperture 413 a rebound shim 22 flexes away from the one or more associated fluid ports 24, allowing the working fluid to flow into the bypass passage 422. During the stroke, the piston 6 also displaces the working fluid into the lower compressions apertures 411, urging the compression shims 21 against the associated ports 24 and covering the ports 41, thereby preventing the working fluid from flowing through the associated compression bypass passages 421 during a rebound stroke.

Figure 9:
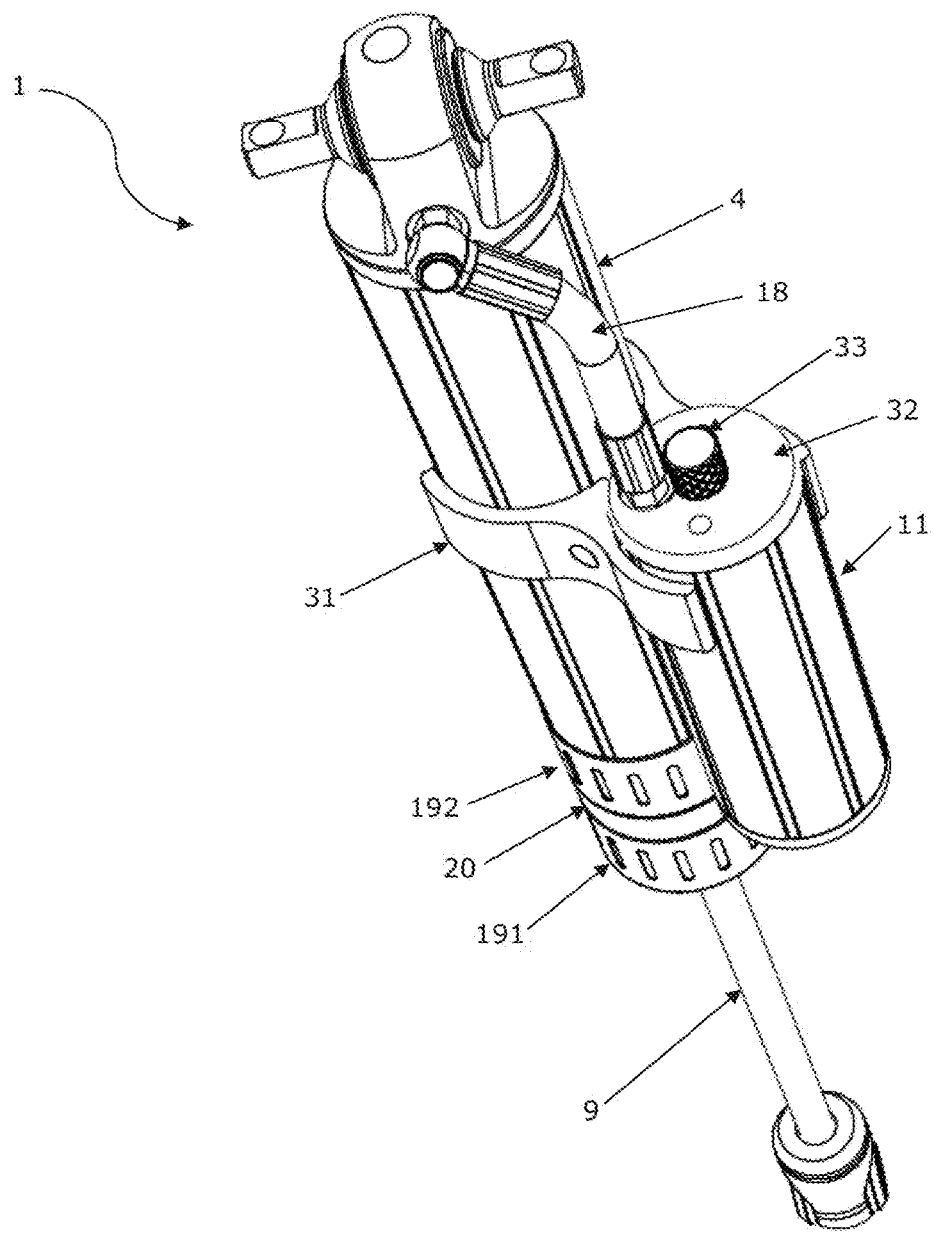
FIG. 9 is an alternative perspective view of the shock absorber.

FIG. 9 is a perspective view of the shock absorber 1 connected to the reservoir 11 by a reservoir mount 31. The reservoir has an end cap 32, through which a valve actuator 33 extends, connected to a plurality of adjustable one-way reservoir valves (not shown) within the reservoir 11.

Figure 10:
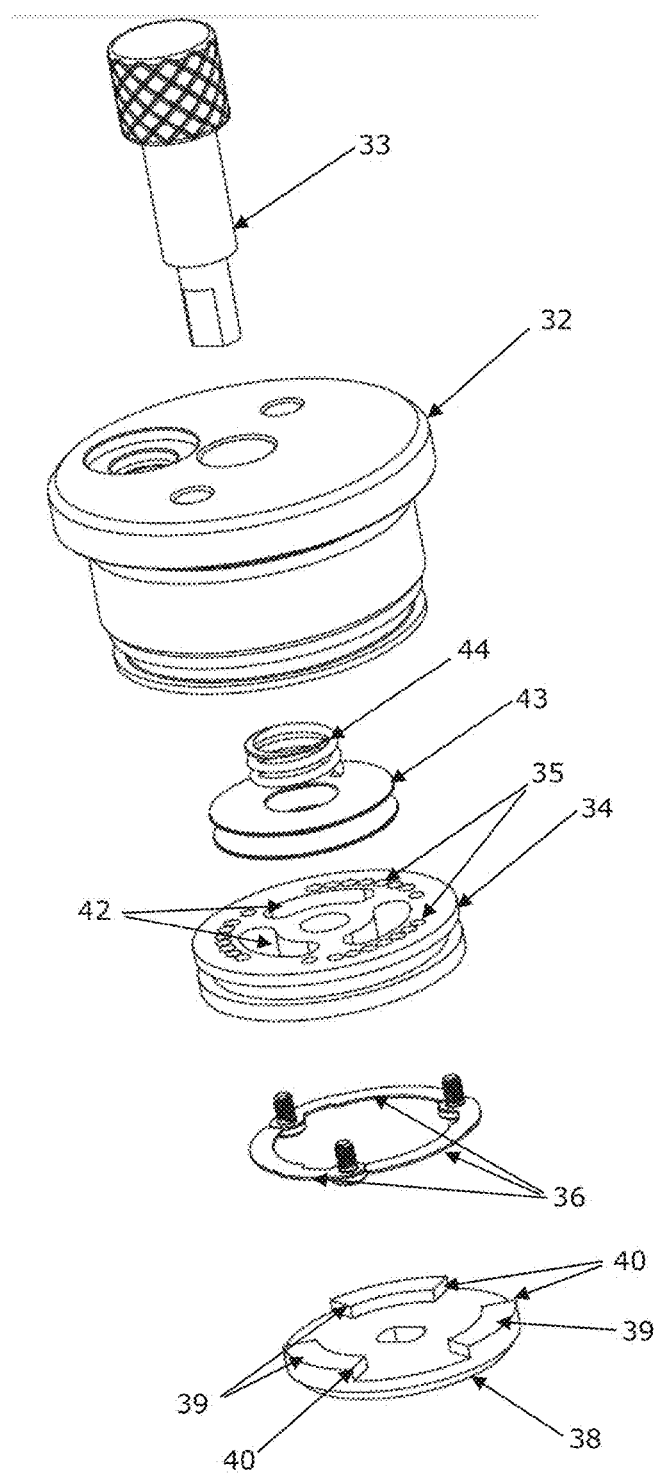
FIG. 10 is an exploded perspective view of an adjustable one-way valve assembly.

FIG. 10 shows an exploded view of the adjustable one-way reservoir valve assembly located within the reservoir, the assembly adapted to control the working fluid flowing into and out of the reservoir bore 14. The assembly comprises a body 34 which defines a plurality of inlet conduits 35 and outlet conduits 42, and to which a plurality of inlet shims 36 are fixed. An adjuster 38 is connected to the valve actuator 33 and has a plurality of castellated portions 39 which abut the inlet shims 36 and provide a fulcrum 40 at one side thereof. One or more outlet shims 43 are secured over the outlet conduits 42 and urged against the conduits 42 by a resilient member 44, being a spring.

In use, when the working fluid is displaced from the bore 5 to the inlet conduits 35, the shims 36 bend about the associated fulcrums 40 allowing the fluid to flow into the reservoir 11. The positions of the fulcrums 40 relative to the free ends of the inlet shims 36 is adjusted by rotating the actuator 33, thereby affecting the active length and effective stiffness of each shim 36, consequently adjusting the damping force. This action is essentially identical to the compression shims 21 described above.

When the working fluid is withdrawn from the reservoir 11 to the bore 5, provided the force exceeds the force exerted by the resilient member 44, the outlet shims 43 are forced away from the outlet conduits 42 allowing the working fluid to flow. However, this valve arrangement may be replaced with a shim arrangement as described above, thereby providing an adjustable one-way valve.

It will be appreciated that the adjustable one-way reservoir valve assembly may be readily adapted to cooperate with the piston 6, providing one or more adjustable one-way valves over the vents extending through the piston 6.

Figure 11:
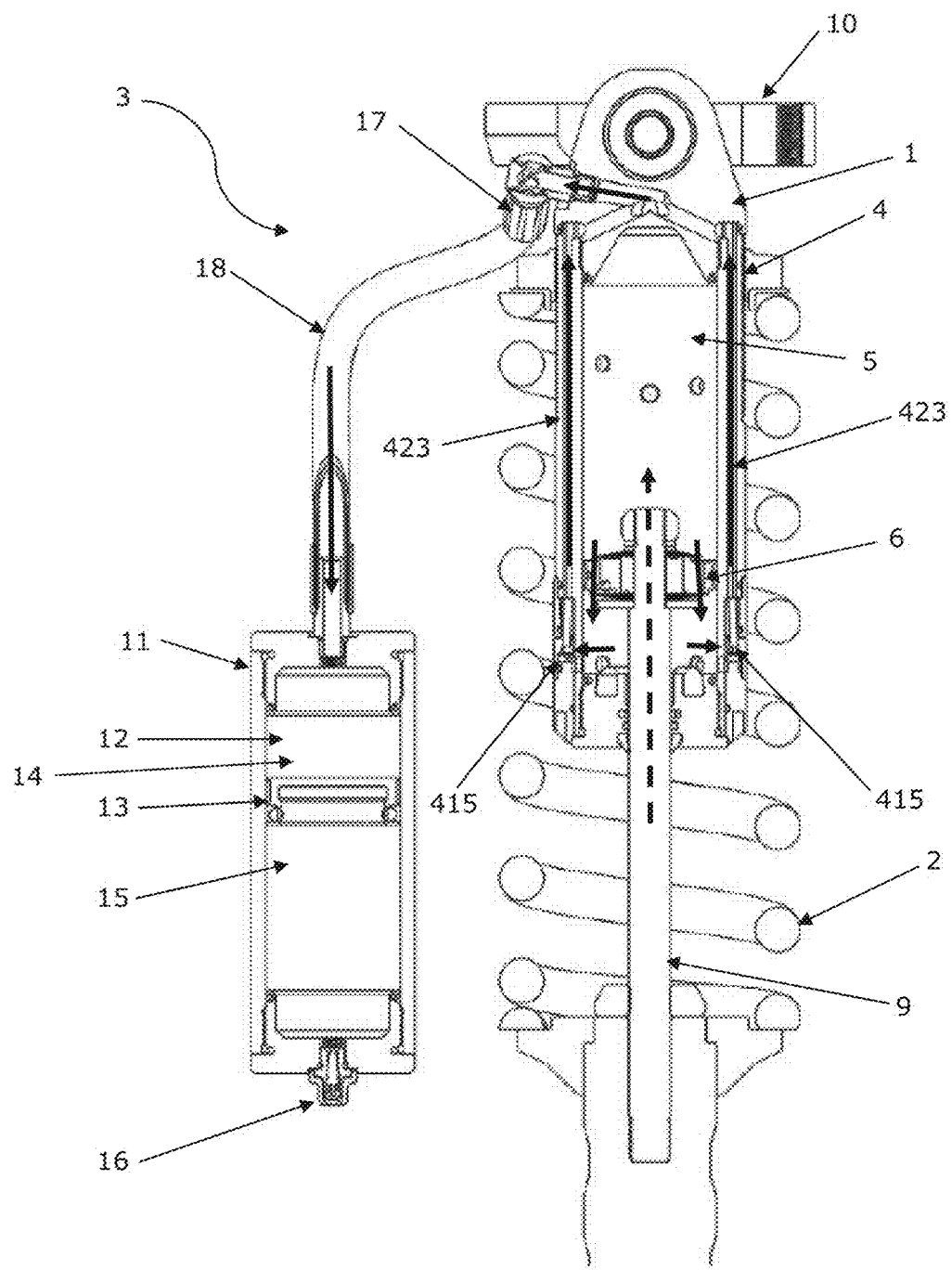
FIG. 11 is a cross-section view of the shock absorber, illustrating fluid flow paths to a reservoir during a compression stroke.

In FIG. 11, the shock absorber 1 is shown in cross-section, illustrating the working fluid flowing from the bore 5 to the reservoir 11 during a compression stroke. The body 4 has further apertures 415 extending through the side-wall of the bore 5 in fluid communication with further bypass passages 423. The bypass passages 423 are also in fluid communication with the reservoir 11, via the union 17 and hose 18. It is preferable that the union 17 and hose 18 are arranged external to the spring 2 arranged around the shock absorber 1 to decrease the likelihood of either component being damaged by the spring 2. Similarly, it is convenient for the reservoir 11 to be located at the chassis end of the shock absorber 1, to allow the reservoir 11 to be connected to the vehicle chassis remotely from the shock absorber 1.

The piston 6 is shown moving vertically upwards in a compression stroke through the bore 5 towards the compression chamber, increasing the pressure of the fluid in the compression chamber and causing the working fluid to flow through the main vent in the piston 6 and/or a bypass passage 421 into the rebound chamber. Due to the presence of the shaft 9 in the rebound chamber, a volume of the working fluid equivalent to the volume of the shaft 9 in the rebound chamber is displaced through the reservoir apertures 415 and through the reservoir bypass passages 423 into the reservoir 11.

Following the compression stroke, the piston 6 moves vertically downwards through the bore 5 in a rebound stroke. As the working fluid was previously displaced into the rebound chamber in the compression stroke, the pressure of the fluid in the rebound chamber (or, as the piston 6 is now travelling in a rebound stroke, the pressure of the fluid in the compression chamber) is maintained above the threshold necessary to cause the working fluid to vaporise, commonly known as cavitation. The maintained working fluid pressure therefore reduces or prevents gas bubbles forming in the working fluid and provides consistent resistance to the motion of the piston 6 through the bore 5 in the rebound stroke.

The location of each reservoir bypass aperture 415 axially along the bore 5 determines which portion of a stroke of the piston 6 the working fluid is displaced into the reservoir 11 in. For example, in FIG. 11, two reservoir bypass apertures 415 are shown immediately adjacent to an end of the bore 5. This arrangement is optimised for compression damping as the position of the apertures 415 ensures that throughout the entire length of a compression stroke, working fluid is displaced into the reservoir 11 and the pressure of the working fluid in the rebound chamber is maintained at the reservoir 'charge pressure', thereby decreasing or preventing cavitation which may affect the motion of the piston 6 during a subsequent rebound stroke. However, during the entire rebound stroke, the pressure will decrease in the compression chamber, potentially causing cavitation of the fluid.

Figure 12:
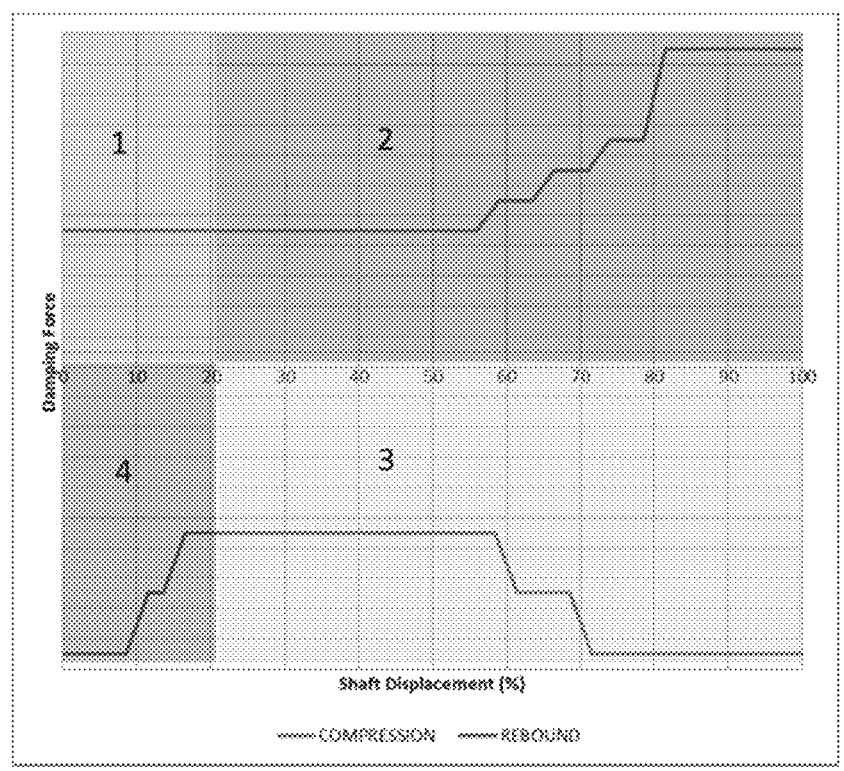
FIG. 12 is an alternative graph of damping force vs. piston displacement, provided by the shock absorber.

In FIG. 12, the relationship between the location of the reservoir bypass aperture 415 in the bore 5 is illustrated in a graph of damping force vs. piston displacement. In the example shown, the reservoir bypass aperture 415 is located in an alternative position to FIG. 11, being at approximately 20% of the displacement of the piston 6 in the bore 5. In this arrangement, the working fluid pressure is maintained by the reservoir 11 as the piston 6 is displaced through sectors 2 and 4. However, during displacement through sectors 1 and 3, the aperture 415 is upstream of the piston 6 (in the direction of travel) which deactivates the bypass passage 423 and which may result in the working fluid in the portion of the bore 5 downstream of the piston 6 to reduce in pressure. This could mean that cavitation is more likely to occur when the piston 6 is displaced through sectors 1 and 3. However, as cavitation relates to charge pressure, the location of the reservoir bypass aperture 415 in a region of low compression or rebound damping would require high shaft velocity speeds to generate the required pressure to cause cavitation, which is less likely to occur.

Figure 13:
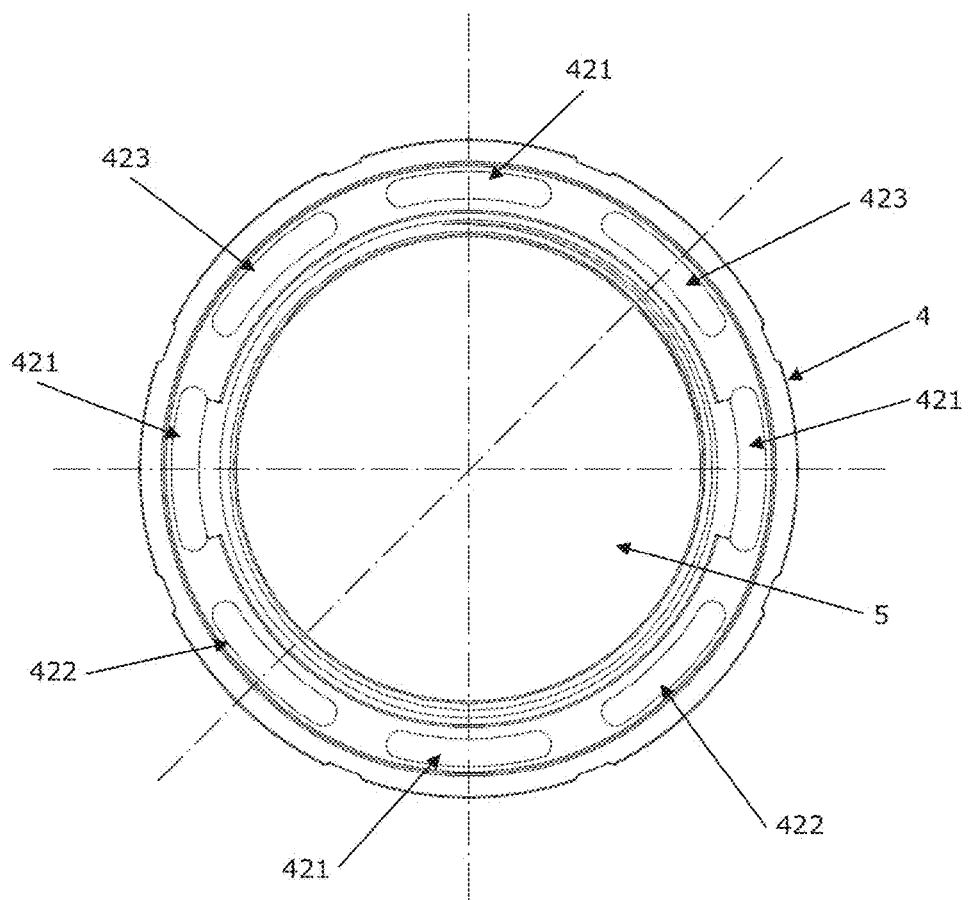
FIG. 13 is a cross-section of a body of the shock absorber.

In FIG. 13, a cross-section of the body 4 is shown. The body 4 defines the bore 5 and eight bypass passages 421, 422, 423 in an annular region to the bore 5. The bypass passages are preferably configured as four compression bypass passages 421, two rebound bypass passages 422 and two reservoir bypass passages 423. Each bypass passage 421, 422, 423 has a kidney-shaped cross-sectional profile in order to optimise the bore 5 diameter in a given outside diameter of the body 4, which is typically limited by the spring 2.

It will be apparent that obvious variations or modifications may be made to the present invention that are in accordance with the spirit of the invention and which are intended to be part of the invention. Although the invention is described above with reference to specific embodiments, it will be appreciated that it is not limited to those embodiments and may be embodied in other forms.

The invention claimed is:

1. A shock absorber comprising:
   a body defining a bore containing a working fluid, the bore having opposed ends and defining a longitudinal axis;
   a piston slidable within the bore;
   two apertures arranged at axially spaced apart positions along the bore and extending through a side-wall of the bore;
   a bypass passage in fluid communication with the two apertures, the bypass passage defining a conduit therebetween; and
   a first adjustable one-way valve arranged to allow the working fluid to flow through the bypass passage in a single direction, the first adjustable one-way valve comprising:
   a shim having a curved body arranged to curve at least partially around the longitudinal axis, the curved body having a fixed end fixed relative to a port and a free end extending from the fixed end and covering the port, the shim being resiliently flexible; and
   an adjuster having a fulcrum arranged against the shim to form a pivot;
   whereby, in use, responsive to the piston moving towards one end of the bore, the working fluid urges the free end away from the port and flexes the shim about the pivot, thereby allowing the working fluid to flow through the port; and
   responsive to the piston moving towards the other end of the bore, the working fluid urges the free end towards the port to covers the port, thereby substantially preventing the working fluid flowing through the port; and
   wherein at least one of the shim and adjuster are displaceable relative to each other to move the pivot relative to the free end.

2. The shock absorber according to claim 1, wherein the port is one of the two apertures.

3. The shock absorber according to claim 1, wherein the adjuster is rotatable about the longitudinal axis to move the pivot relative to the free end.

4. The shock absorber according to claim 1, wherein the curved body is arranged so that the free end flexes about the pivot axially relative to the longitudinal axis.

5. The shock absorber according to claim 1, further comprising:
a further two apertures arranged at respective axially spaced apart positions along the bore and extending through the side-wall of the bore;
a further bypass passage in fluid communication with the further apertures, the further bypass passage defining a conduit therebetween; and
a second adjustable one-way valve arranged to allow the working fluid to flow through the further bypass passage in a single direction, the second adjustable one-way valve comprising features identical to the features of the first adjustable one-way valve.

6. The shock absorber according to claim 5, wherein the second adjustable one-way valve is arranged so that the single direction of the second adjustable one-way valve is opposite to the single direction of the first adjustable one-way valve.

7. The shock absorber according to claim 5, wherein the adjuster of the second adjustable one-way valve is mechanically connected to the adjuster of the first adjustable one-way valve, thereby allowing both adjusters to be moved simultaneously.

8. The shock absorber according to claim 7, wherein the adjusters are mechanically connected to an adjuster ring, the adjuster ring extending at least partially around the bore and being rotatable about the longitudinal axis to move each adjuster relative to the free end of the respective shim.

9. The shock absorber according to claim 1, further comprising:
a fluid distributor connected between one of the two apertures and the bypass passage, the fluid distributor defining a second conduit therebetween; and
wherein the first adjustable one-way valve is arranged across the second conduit to allow the working fluid to flow through the second conduit along the single direction only.

10. A suspension assembly for a vehicle comprising:
the shock absorber according to claim 1; and
a coil spring arranged around the shock absorber and connected thereto,
the coil spring defining an inside diameter within which the shock absorber is disposed, and
wherein the first adjustable one-way valve is dimensioned to fit within the inside diameter.

11. A shock absorber for a vehicle comprising:
a body defining a bore containing a working fluid, the bore having opposed ends and defining a longitudinal axis;
a first bypass passage arranged parallel and adjacent to the bore, the first bypass passage being in fluid communication with the bore;
a piston slidable within the bore, the piston dividing the bore into a compression chamber and a rebound chamber;
a pair of first apertures arranged at axially spaced apart positions along the bore, each first aperture extending through a side-wall of the bore so that one of the first apertures fluidly couples the first bypass passage and the bore;
a fluid distributor connected to the body and adapted to receive a portion of the bore, the fluid distributor defining a first conduit between the other first aperture and the first bypass passage to communicate the working fluid from the bore to the first bypass passage; and
an adjustable one-way valve arranged to allow the working fluid to flow through the first conduit in a single direction, the adjustable one way valve comprising:
a shim having a curved body arranged to curve at least partially around the longitudinal axis, the curved body having a first end fixed relative to a port and a free end extending from the first end and covering the port, the shim being resiliently flexible; and
an adjuster having a fulcrum arranged against the shim to form a pivot;
whereby, in use, responsive to the piston moving towards one end of the bore, the working fluid urges the free end away from the port and flexes the shim about the pivot, thereby allowing the working fluid to flow through the port, and
responsive to the piston moving towards the other end of the bore, the working fluid urges the free end towards the port to cover the port, thereby substantially preventing the working fluid flowing through the port; and
wherein at least one of the shim and adjuster are displaceable relative to each other to move the pivot relative to the free end.

12. The shock absorber according to claim 11, wherein the shock absorber further comprises:
a second bypass passage arranged parallel and adjacent to the bore, the second bypass passage being in fluid communication with the bore; and
a pair of second apertures arranged at axially spaced apart positions along the bore, each second aperture extending through the side-wall of the bore so that one of the second apertures fluidly couples the second bypass passage and the bore;
wherein the fluid distributor defines a second conduit between the other second aperture and the second bypass passage to communicate the working fluid between the bore and the second bypass passage.

13. The shock absorber according to claim 12, wherein the fluid distributor has a further adjustable one-way valve arranged to allow the working fluid to flow through the second conduit in a single direction, the further adjustable one-way valve comprising identical features to the first-mentioned adjustable one-way valve.

14. The shock absorber according to claim 13, wherein the adjustable one-way valve arranged across the first conduit allows the working fluid to flow through the respective port when the piston moves towards the compression chamber, and the further adjustable one-way valve arranged across the second conduit allows the working fluid to flow through the respective port when the piston moves towards the rebound chamber.

15. The shock absorber according to claim 11, wherein the curved body is arranged so that the free end flexes about the pivot axially relative to the bore.

16. A suspension assembly for a vehicle comprising:
the shock absorber according to claim 11; and
a coil spring arranged around the shock absorber and connected thereto, the coil spring defining an inside diameter within which the shock absorber is disposed, wherein the fluid distributor has an external peripheral region dimensioned to fit within the inside diameter.

* * * * *